US012343874B2

(12) United States Patent
Tunyasuvunakool et al.

(10) Patent No.: US 12,343,874 B2
(45) Date of Patent: Jul. 1, 2025

(54) REINFORCEMENT AND IMITATION LEARNING FOR A TASK

(71) Applicant: DeepMind Technologies Limited, London (GB)

(72) Inventors: Saran Tunyasuvunakool, London (GB); Yuke Zhu, Stanford, CA (US); Joshua Merel, Chicago, IL (US); János Kramár, London (GB); Ziyu Wang, Markham (CA); Nicolas Manfred Otto Heess, London (GB)

(73) Assignee: DeepMind Technologies Limited, London (GB)

( * ) Notice: Subject to any disclaimer, the term of this patent is extended or adjusted under 35 U.S.C. 154(b) by 258 days.

(21) Appl. No.: 18/306,711

(22) Filed: Apr. 25, 2023

(65) Prior Publication Data
US 2023/0330848 A1 Oct. 19, 2023

Related U.S. Application Data

(63) Continuation of application No. 16/174,112, filed on Oct. 29, 2018, now abandoned.

(60) Provisional application No. 62/578,368, filed on Oct. 27, 2017.

(51) Int. Cl.
| | |
|---|---|
| B25J 9/16 | (2006.01) |
| G06N 3/008 | (2023.01) |
| G06N 3/044 | (2023.01) |
| G06N 3/045 | (2023.01) |
| G06N 3/08 | (2023.01) |
| G06N 3/084 | (2023.01) |

(52) U.S. Cl.
CPC ............. *B25J 9/163* (2013.01); *B25J 9/161* (2013.01); *B25J 9/1697* (2013.01); *G06N 3/008* (2013.01); *G06N 3/044* (2023.01); *G06N 3/045* (2023.01); *G06N 3/08* (2013.01); *G06N 3/084* (2013.01)

(58) Field of Classification Search
CPC .......... B25J 9/163; B25J 9/161; B25J 9/1697; G06N 3/008; G06N 3/044; G06N 3/045; G06N 3/08; G06N 3/084
USPC ........................................................ 700/245
See application file for complete search history.

(56) References Cited

U.S. PATENT DOCUMENTS

| | | | |
|---|---|---|---|
| 10,926,408 B1* | 2/2021 | Vogelsong | B25J 9/163 |
| 11,341,364 B2* | 5/2022 | Bousmalis | B25J 9/1605 |

(Continued)

FOREIGN PATENT DOCUMENTS

CN 105637540 6/2016

OTHER PUBLICATIONS

Reinforcement and Imitation Learning for Diverse Visumotor Skills, Under review as a conference paper at ICLR 2018.
(Continued)

*Primary Examiner* — Kira Nguyen
(74) *Attorney, Agent, or Firm* — Fish & Richardson P.C.

(57) ABSTRACT

A neural network control system for controlling an agent to perform a task in a real-world environment, operates based on both image data and proprioceptive data describing the configuration of the agent. The training of the control system includes both imitation learning, using datasets generated from previous performances of the task, and reinforcement learning, based on rewards calculated from control data output by the control system.

20 Claims, 3 Drawing Sheets

(56) References Cited

U.S. PATENT DOCUMENTS

| | | | | |
|---|---|---|---|---|
| 11,651,208 | B2* | 5/2023 | Xu | G06N 3/08 |
| | | | | 706/25 |
| 2017/0024643 | A1 | 1/2017 | Lillicrap et al. | |
| 2017/0032035 | A1 | 2/2017 | Gao et al. | |
| 2018/0032863 | A1* | 2/2018 | Graepel | G06N 3/045 |
| 2018/0165603 | A1 | 6/2018 | Van Seijen et al. | |
| 2019/0232489 | A1* | 8/2019 | Pascanu | G06N 3/096 |
| 2023/0256593 | A1* | 8/2023 | Zolna | B25J 9/163 |
| | | | | 706/21 |

OTHER PUBLICATIONS

Boularias et al. "Relative entropy inverse reinforcement learning," Proceedings of the International Conference on Artificial Intelligence and Statistics, Jun. 2011, 8 pages.
Bousmalis et al. "Using Simulation and Domain Adaptation to improved Efficiency of Deep Robotic Grasping," arXiv 1709.07857v2, Sep. 25, 2017, 9 pages.
Duan et al. "One-shot imitation learning," arXiv 1703.07326v3, Dec. 4, 2017, 27 pages.
Edmonds et al., "Feeling the force: Integrating force and pose for fluent discovery through imitation learning to open medicine bottles," 2017 EIII/RSJ International Conference and Intelligent Robots and Systems, Sep. 2017, pp. 3530-3537.
EP Office Action in European Appln. No. 18203124.5, dated Feb. 18, 2021, 15 pages.
Extended European Search Report in European Appln. 18203124.5-1221, dated Apr. 8, 2019, 14 pages.
Finn et al. "Guided cost learning: Deep inverse optimal control via policy optimization," Proceedings of the 33$^{rd}$ International Conference on machine Learning, Jun. 2016, 10 pages.
Finn et al. "One-shot Visual Imitation Learning via Meta-Learning," arXiv 1709.04905v1, Sep. 14, 2017, 12 pages.
Goodfellow et al. "Generative adversarial nets," NIPS Dec. 2014, 9 pages.
Gu et al. "Continuous deep Q-learning with model-based acceleration," ICML, Jun. 2016, 10 pages.
Gu et al. "Deep reinforcement learning for robotic manipulation," arXiv 1610.00633v1, Oct. 3, 2016, 9 pages.
Gupta et al. "Learning dexterous manipulation for a soft robotic hand from human demonstrations," arXiv 1603.06348v3, Mar. 20, 2017, 9 pages.
Heess et al. "Learning and transfer of modulated locomotor controllers," arXiv 1610.05182, Oct. 17, 2016, 13 pages.
Heess et al. "Learning continuous control policies by stochastic value gradients," NIPS, Dec. 2015, 9 pages.
HM Biu et al. Using grayscale images for object recognition with convolutional-recursive neural network. Jul. 2016. [retrieved from internet on Nov. 19, 2022] <URL: https://ieeexplore.ieee.org/abstract/document/7562656> (Year: 2016).
Ho et al. "Generative adversarial imitation learning," NIPS, Dec. 2016, 9 pages.
Jaderberg et al. "Reinforcement learning with unsupervised auxiliary tasks," arXiv 1611.05397, Nov. 16, 2016, 14 pages.
James et al. "Transferring end-to-end visuomotor control from simulation to real world for a multi-stage task," arXiv 1707.02267v2, Oct. 17, 2017, 10 pages.
Kakade et al. "Approximately optimal approximate reinforcement learning," ICML Jul. 2002, 8 pages.
Kingma et al. "Adam: A method of stochastic optimization," arXiv 1412.6980v9, Jan. 30, 2017, 15 pages.
Kroemer et al., "Combining active learning and reactive control for robot grasping," Robotics and Autonomous Systems, Sep. 2010, 58(9):1105-1116.
Kumar et al. "Learning dexterous manipulation policies from experience and imitation," arXiv 1611.05095, Nov. 15, 2016, 17 pages.
Levine et al. "End-to-end training of deep visuomotor policies," Journal of Machine Learning Research, 17(1), Jan. 2016, 40 pages.
Levine et al. "Guided policy search," ICML, Feb. 2013, 9 pages.
Levine et al. "Learning hand-eye coordination for robotic grasping with deep learning and large-scale data collection," arXiv 1603.02199v4, Aug. 28, 2016, 12 pages.
Li et al. "InfoGAIL: Interpretabe Imitation Learning from Visual Demonstrations," arXiv 1703.08840v2, Nov. 14, 2017, 14 pages.
Li et al. Inferring The Latent Structure of Human Decision-Making from Raw Visual Inputs. arXiv. Mar. 26, 2017. arXiv:1703.08840 (Year: 2017).
Lillicrap et al. "Continuous control with deep reinforcement learning," arXiv 1509.02971v5, Feb. 29, 2016, 14 pages.
Liu et al. "Imitation from observation: Learning to imitate behaviors from raw video via context translation," arXiv 1707.03374v2, Jun. 18, 2018, 8 pages.
Merel et al. "Learning human behaviors from motion capture by adversarial imitation," arXiv 1707.02201v2 Jul. 10, 2017, 12 pages.
Mnih et al. "Human-level control through deep reinforcement learning," Nature 518(7540) Feb. 2015, 13 pages.
Nair et al. "Overcoming exploration in reinforcement learning with demonstrations," arXiv 1709.10089v2, Feb. 25, 2018, 8 pages.
Nair et al. Massively Parallel Methods for Deep Reinforcement Learning. arXiv. Jul. 1, 2015. arXiv:1507.04296 (Year: 2015).
Ng et al. "Policy invariance under reward transformation: Theory and Application to reward shaping," ICML, Jun. 1999, 10 pages.
Office Action in Chinese Appln. No. 201811269614.4, dated Sep. 22, 2022, 19 pages (with English translation).
Peng et al. "Sim-to-Real Transfer of Robotic Control with Dynamics Randomization," arXiv 1710.06537v3, Mar. 3, 2018, 8 pages.
Pinto et al. "Asymmetric Actor Critic for Image-Based Robot Learning," arXiv 1710.06542v1, Oct. 18, 2017, 8 pages.
Pinto et al. "Supervising self-supervision: Learning to grasp from 50k tries and 700 robot hours," arXiv 1509.06825, Sep. 23, 2015, 8 pages.
Popov et al. "Data-efficient deep reinforcement learning for dexterous manipulation," arXiv 1704.03073, Apr. 10, 2017, 12 pages.
Rahmatizadeh et al. "Vision-based multi-task manipulation for inexpensive robots using end-to-end learning from demonstration," arXiv 1707.02920v2, Apr. 22, 2018, 8 pages.
Rajeswaran et al. "Learning complex dexterous manipulation with deep reinforcement learning and demonstrations," arXiv 1709.10087v2, Jun. 26, 2018, 9 pages.
Ross et al. "A reduction of imitation learning and structured prediction to no-regret online learning," ICAIS Jun. 2011, 9 pages.
Rusu et al. "Progressive neural networks," arXiv 1606.04671v3 Sep. 7, 2016, 14 pages.
Rusu et al. "Sim-to-real robot learning from pixels with progressive nets," arXiv 1610.04286v2, May 22, 2018, 9 pages.
S James and E Johns. 3D Simulation for Robot Arm Control with Deep 0-Learning. arXiv. Dec. 13, 2016. arXiv:1609.03759 (Year: 2016).
Schenck et al. "Reasoning about liquids via closed-loop simulation," arXiv 1703.01656v2 Jun. 9, 2017, 10 pages.
Schulman et al. "Proximal policy optimization algorithms," arXiv 1707.06347v2, Aug. 28, 2017, 12 pages.
Schulman et al. "Trust region policy optimization," International Conference on Machine Learning, Jun. 2015, 9 pages.
Sermanet et al. "Time-constrastive networks: Self-supervised learning from multi-view observation," arXiv 1704.06888v3, Mar. 20, 2018, 15 pages.
Silver et al. "Deterministic policy gradient algorithms," ICML, Jun. 2014, 9 pages.
Silver et al. "Mastering the game of go with deep neural networks and tree search," Nature 529(7587) Jan. 2016, 20 pages.
Singh et al., "GLPAC: Generalizing vision-based robotic skills using weakly labeled images," arXiv, Aug. 7, 2017, 12 pages.
Singh, S.P. Transfer of learning by composing solutions of elemental sequential tasks. Mach Learn 8, 323-339 (1992). https://doi.org/10.1007/BF00992700 (Year: 1992).
Tobin et al. "Domain randomization for transferring deep neural networks from simulation to the real world," arXiv 1703.06907v1, Mar. 20, 2017, 8 pages.
Todorov et al. "Mujoco: A physics engine for model-based control," IEEE/RSJ International Conference on Intelligent Robots and Systems, Oct. 2012, 8 pages.

(56) References Cited

OTHER PUBLICATIONS

Vecerik et al. "Leveraging demonstrations for deep reinforcement learning on robotics problems with sparse rewards," arXiv 1707.08817v1, Jul. 27, 2017, 10 pages.
Viereck et al. "Learning a visumotor controller for real world robotic grasping using easily simulated depth images," arXiv 1706.04652v3, Nov. 17, 2017, 10 pages.
Wang et al. "Robust imitation of diverse behaviors," NIPS, Dec. 2017, 10 pages.
Wulfmeier et al, "Addressing appearance change in outdoor robotics with adversarial domain adaptation," arXiv, Sep. 17, 2007, 8 pages.
Yahya et al. "Collective robot reinforcement learning with distributed asynchronous guided policy search," arXiv 1610.00673, Oct. 3, 2016, 8 pages.
Zeng et al., "Visual Forecasting by Imitating Dynamics in Natural Sequences," 2017 IEEE International Conference on Computer Vision, Oct. 2017, pp. 3018-3027.
Zhu et al, "Reinforcement and imitation learning for diverse visuomotor skills," arXiv, May 27, 2018, 12 pages.

* cited by examiner

REINFORCEMENT AND IMITATION LEARNING FOR A TASK

CROSS REFERENCE TO RELATED APPLICATION

This patent application is a continuation (and claims the benefit of priority under 35 USC 120) of U.S. patent application Ser. No. 16/174,112, filed Oct. 29, 2018, which is a non-provisional of and claims priority to U.S. Provisional Patent Application No. 62/578,368, filed on Oct. 27, 2017, the entire contents of which are hereby incorporated by reference.

BACKGROUND

This specification relates to methods and systems for training a neural network to control an agent to carry out a task in an environment.

In a reinforcement learning (RL) system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

In an imitation learning (IL) system, a neural network is trained to control an agent to perform a task using data characterizing instances in which the task has previously been performed by the agent under the control of an expert, such as a human user.

SUMMARY

This specification generally describes how a system implemented as computer programs in one or more computers in one or more locations can perform a method to train (that is, adjust the parameters of) an adaptive system ("neural network") used to select actions to be performed by an agent interacting with an environment.

The agent is a mechanical system (e.g., a "robot", but it may alternatively be a vehicle, such as one for carrying passengers) comprising one or more members connected together, for example using joints which permit relative motion of the members, and one or more drive mechanisms which control the relative position of the members. For example, the neural network may transmit commands (instructions) to the agent in the form of commands which indicate "joint velocities", that is the angular rate at which the drive mechanism(s) should move one or more of the members relative to other of the members. The agent is located within a real-world ("real") environment. The agent may further comprise at least one drive mechanism to translate and/or rotate the agent in the environment under the control of the neural network. Note that in some implementations, the agent may contain two or more disjoint portions (portions which are not connected to each other), and which act independently based on respective commands they receive from the neural network.

As described below, the training method may make use of a simulated agent. The simulated agent has a simulated motion within a simulated environment which mimics the motion of the robot in the real environment. Thus the term "agent" is used to describe both the real agent (robot) and the simulated agent.

The agent (both the real agent and the simulated agent) is controlled by the neural network to perform a task in which the agent manipulates one or more objects which are part of the environment and which are separate from (i.e., not part of) the agent. The task is typically defined based on one or more desired final positions of the object(s) following the manipulation.

In implementations described herein, the neural network makes use of data which comprises images of the real or simulated environment (typically including an image of at least a part of the agent) and proprioceptive data describing one or more proprioceptive features which characterize the configuration of the (real or simulated) agent. For example, the proprioceptive features may be positions and/or velocities of the members of the agent, for example joint angles, and/or joint angular velocities. Additionally or alternatively they may include joint forces and/or torques and/or accelerations, for example gravity-compensated torque feedback, and global or relative pose of an item held by the agent.

In general terms, the implementation proposes that the neural network receives both image and proprioceptive data, and is trained using an algorithm having advantages of both imitation learning and reinforcement learning.

Specifically, the training employs, for each of a plurality of previous performances of the task, a respective dataset characterizing the corresponding performance of the task. Each dataset describes a trajectory comprising a set of observations characterizing a set of successive states of the environment and the agent, and the corresponding actions performed by the agent. Each previous performance of the task may be previous performance of the task by the agent under the control of an expert, such as a human. This is termed an "expert trajectory". Each dataset may comprise data specifying explicitly the positions of the objects at times during the performance of the task (e.g., in relation to coordinate axes spanning the environment) and corresponding data specifying the position and configuration of the agent at those times, which may be in the form of proprioceptive data. In principle, alternatively or additionally, each dataset may comprise image data encoding captured images of the environment during the performance of the task Furthermore, as for conventional reinforcement learning, an initial state of the environment and agent are defined, and then the neural network generates a set of commands (i.e. at least one command, or more preferably a plurality of successive commands). For each set of commands, the effect on the environment of supplying the commands to the agent (successively in the case that the set includes a plurality of successive commands) is determined, and used to generate at least one reward value indicative of how successfully the task is carried out upon implementation of the set of commands by the agent. Based on the reward values, the neural network is updated. This process is repeated for different initial states.

Each set of commands results in a respective further dataset which may be called an imitation trajectory which comprises both the actions performed by the agent in implementing the commands in sequence, and a set of observations of the environment while the set of commands is performed in sequence (i.e., a sequence of states which the environment takes as the set of commands are successively performed). The reward value may be obtained using a final state of the environment following the performance of the set of commands. Alternatively, more generally, it may be obtained from any one or more of the states of the environment as the commands are implemented.

The neural network is trained (i.e., one or more parameters of the neural network are adjusted) based on the datasets, the sets of commands and the corresponding reward values.

Thus, the training of the neural network benefits both from whatever expert performances of the task are available, and from the results of the experimentation associated with reinforcement learning. The resultant system may learn the task more successfully than a neural network trained using reinforcement learning or imitation learning alone.

The training of the neural network may be performed as part of a process which includes, for a certain task:
  performing the task (e.g., under control of a human learner) a plurality of times and collecting the respective datasets characterizing the performances;
  initializing a neural network;
  training the neural network by the technique described above; and
  using the neural network to control a (real-world) agent to perform the task in an environment.

Compared to a system which just uses imitation learning, the trained neural network of the present disclosure will typically learn to control the agent to perform the task more accurately because it is trained from a larger database of examples. From another point of view, the number of expert trajectories needed to achieve a certain level of performance in the task is reduced compared to using imitation learning alone, which is particularly significant if the expert trajectories are expensive or time-consuming to obtain. Furthermore, the neural network may eventually learn to perform the task using a strategy which is different from, and superior to, the strategy used by the human expert.

Compared to a system which just learns by reinforcement learning, the trained neural network may make more natural motions (e.g., less jerky ones) because it benefits from examples of performing the task well.

Furthermore, compared to a system which just learns by reinforcement learning, learning time may be improved, and the amount of computational resources consumed reduced. This is because the first command sets which are generated during the training procedure are more likely to be successful in performing the task, and thus are more informative about how the task can be performed. In other words, the datasets which characterize the demonstration trajectories initiate high-value learning experiences, so there is synergy between the learning based on the datasets and the learning based on the generation of sets of commands.

The one or more parameters of the neural network may be adjusted based on a hybrid energy function. The hybrid energy function includes both an imitation reward value ($r_{gail}$) derived using the datasets, and a task reward value ($r_{task}$) calculated using a task reward function. The task reward function defines task reward values based on states of the environment (and optionally also the agent) which result from the sets of commands.

The imitation reward value may be obtained from a discriminator network. The discriminator network may be trained using the neural network as a policy network. Specifically, the discriminator network may be trained to give a value indicative of a discrepancy between results commands output by the neural network (policy network) and an expert policy inferred from the datasets.

Preferably, the discriminator receives input data characterizing the positions of the objects in the environment, but preferably not image data and/or not proprioceptive data. Furthermore, it preferably does not receive other information indicating the position/configuration of the agent.

Updates of the neural network, are generated using an activation function estimator obtained by subtracting a value function (baseline value) from an initial reward value, such as the hybrid energy, indicating whether the task (or at least a stage in the task) is successfully performed by an agent which receives the set of commands. The value function may be calculated, e.g., using a trained adaptive system, using data characterizing the positions and/or velocities of agent and/or the object(s), which may be image data and proprioceptive data, but more preferably is data directly indicating the positions of the object(s) and/or agent.

In principle, during the training, the sets of commands generated by the neural network could be implemented in the real work to determine how successful they are controlling a real agent to perform the task. However, more preferably, the reward value is generated by computationally simulating a process carried out by the agent in the environment, starting from an initial state, based on the commands, to generate successive simulated states of the environment and/or agent, up to a simulated final state of the environment and/or agent, and calculating the reward value based at least on the final state of the simulated environment. The simulated state of the environment and/or agent may be explicitly specified by "physical state data".

The neural network itself may take many forms. In one form, the neural network may comprise a convolutional neural network which receives the image data and from it generates convolved data. The neural network may further comprise at least one adaptive component (e.g., a multilayer perceptron) which receives the output of the convolutional neural network and the proprioceptive data, and generates the commands. The neural network may comprise at least one long short term neural network, which receives data generated both from the image data and the proprioceptive data.

Training of one or more components of the neural network may be improved by defining an auxiliary task (i.e., a task other than the task the overall network is trained to control the agent to perform) and training those component(s) of the neural network using the auxiliary task. The training using the auxiliary task may be performed before training the other adaptive portions of the neural network by the techniques described above. For example, prior to the training of the neural network as described above, there may be a step of training a convolutional network component of the neural network as part of an adaptive system which is trained to perform an auxiliary task based on image data. Alternatively, the training of the convolutional network to learn the auxiliary task may be simultaneous with (e.g., interleaved with) the training of the neural network to perform the main task.

Preferably many instances of the neural network are trained in parallel by respective independent computational processes referred to as "workers", which may by coordinated by a computational process termed a "controller". Certain components of the instances of the neural network (e.g., a convolutional network component) may be in common between instances of the neural network. Alternatively or additionally, sets of commands and reward values generated in the training of the multiple neural network instances may be pooled, to permit a richer exploration of the space of possible policy models.

The initial state may be (at least with a certain probability greater than zero) a predetermined state which is a state comprised in one of the expert trajectories. In other words, the expert trajectories provide a "curriculum" of initial states. Compared to completely random initial states, states from the expert trajectories are more likely to be representative of states which the trained neural network will encounter when it acts in a similar way to the human expert. Thus, training using the curriculum of initial states produces more relevant information than if the initial state is chosen randomly, and this can lead to a greater speed of learning.

The initial states of the environment and agent may be selected probabilistically. Optionally, with a non-zero probability it is a state from one of the expert trajectories, and with a non-zero probability it is a state generated otherwise, e.g., from a predefined distribution, e.g., one which is not dependent on the expert trajectories.

It has been found that for certain tasks it is advantageous to divide the task into a plurality of portions (i.e., task-stages) using insight (e.g., human insight) into the task. The task stages may be used for designing the task reward function. Alternatively or additionally, prior to the training of the neural network, for each task-stage one or more predefined initial states are derived (e.g., from the corresponding stages of one or more of the expert trajectories). During the training, one of the predefined initial states is selected as the initial state (at least with a certain probability greater than zero). In other words, the curriculum of initial states includes one or more states for each of the task stages. This may further reduce the training time, reduce the computational resources required and/or result in a trained neural network which is able to perform the task more accurately.

BRIEF DESCRIPTION OF THE DRAWINGS

Examples of the disclosed systems and methods will now be described for the sake of example only with reference to the following figures, in which.

DETAILED DESCRIPTION

Figure 1:
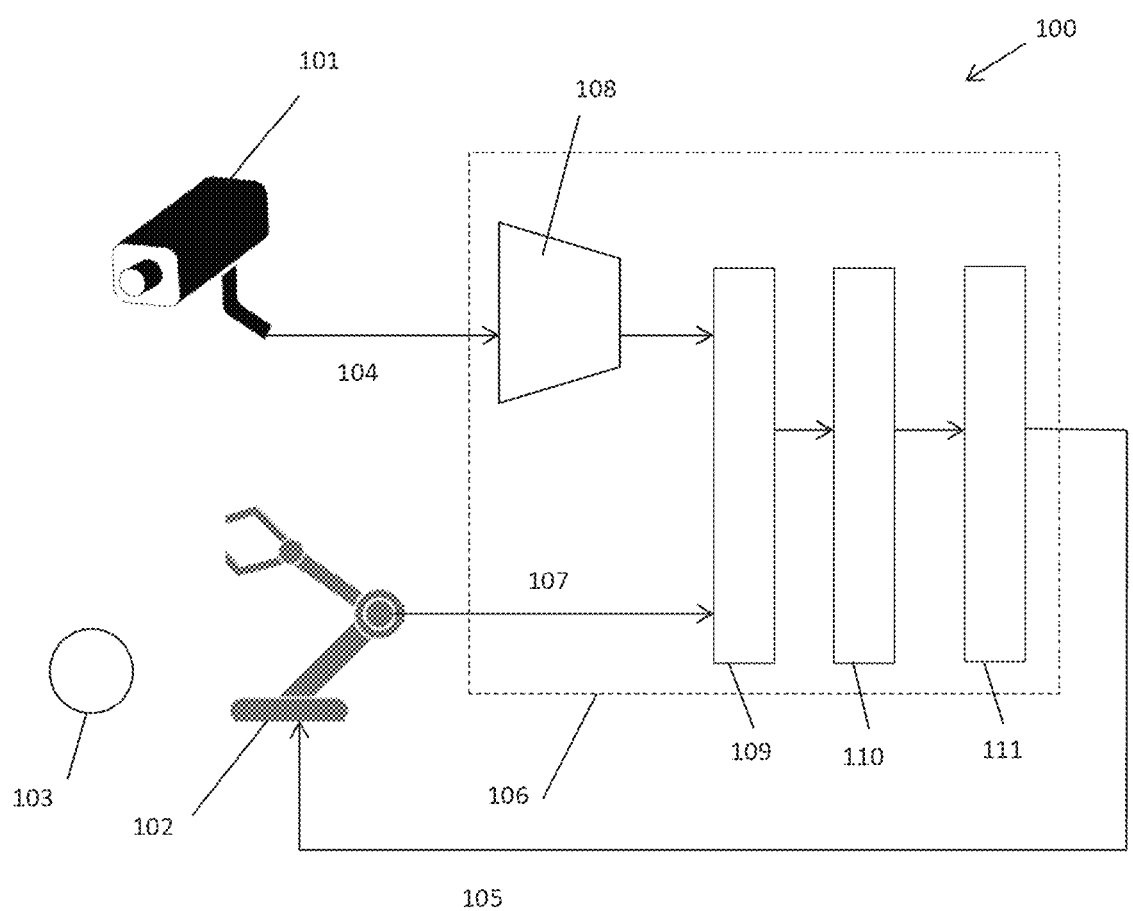
FIG. 1 shows a trained neural network produced by a method according to the present disclosure.

FIG. 1 shows a system 100 according to an example of the present disclosure. It includes at least one image capture device (e.g., a still camera or video camera) 101, and at least one agent 102. The agent is a "real world" device which operates on one or more real-world objects in a real-world environment including at least one object 103. The device may for example be a robot, but may alternatively be a vehicle, such as an autonomous or semi-autonomous land or air or sea vehicle. For simplicity only a single image capture device 101, only a single object 103 and only a single agent 102 are illustrated, but in other examples multiple image capture devices, and/or objects, and/or agents, are possible.

The images captured by the image capture device 100 include the object 103, and typically also the agent 102. The image capture device 100 may have a static location, at which it captures images of some or all of the environment. Alternatively, the image capture device 101 may be capable of being controlled to vary its field of view, under the influence of a control mechanism (not shown). In some implementations, the image capture device 101 may be positioned on the agent 102, so that it moves with it. The image capture device 101 uses the images to generate image data 104. The image data may take the form of RGB (red-green-blue) data for each of a plurality of pixels in an array.

Control signals 105 for controlling the agent 102 are generated by a control system 106, which is implemented as a neural network. The control system 106 receives as one input the image data 104 generated by the image capture devices 101.

A further input to the control system 106 is data 107 characterizing the present positioning and present configuration of the agent 102. This data is referred to as "proprioceptive" data 107.

In a first example, the agent 102 may include one or more joints which permit one member (component) of the agent 102 to be rotated with one, two or three degrees of freedom about another member of the agent 102 (e.g., a first arm of the agent may pivot about a second arm of the agent; or a "hand" of the agent may rotate about one or more axes with respect to an arm of the agent which supports it), and if so the proprioceptive data 107 may indicate a present angular configurations of each of these joints.

In a second example, the proprioceptive data 107 may indicate an amount by which a first member of the robot is translated relative to another member of the robot. For example, the first member may be translatable along a track defined by the other member of the robot.

In a third example, the agent 102 may comprise one or more drive mechanisms to displace the agent as a whole (by translation and/or rotation) relative to its environment. For example, this displacement may be an amount by which a base member of the agent 102 is translated/rotated within the environment. The proprioceptive data 107 may indicate the amount by which the agent has been displaced.

These three examples of proprioceptive data are combinable with each other in any combination. Additionally or alternatively, the proprioceptive data 107 may comprise data indicating at least one time-derivative of any of these three examples of proprioceptive data, e.g., a first derivative with respect to time. That is, the proprioceptive data 107 may include any one or more of the angular velocity, in one, two or three dimensions, at which one member of the robot rotates about another member of the robot at a joint; and/or a translational velocity of one member of the robot with respect to another; and/or the angular or translational velocity of the robot as a whole within its environment.

The control system 106 includes a plurality of neural network layers. In the example of FIG. 1 it includes a convolutional network 108 which receives the image data 104. The convolutional network 108 may comprise one or more convolutional layers. The control system 106 further includes a neural network 109 (which may be implemented as a single or multi-layer perceptron), which receives both the proprioceptive data 107 and the output of the convolutional network 108. For example, the proprioceptive data 107 may be concatenated with the output of the convolutional network 108 to form an input string for the perceptron 109.

The control system 106 further includes a recurrent neural network 110, such as an LSTM unit, which receives the output of the perceptron 109, and generates an output.

The control system 106 further includes an output layer 111 which receives the output of the recurrent neural network 110 and from it generates the control data 105. This may take the form of a desired velocity for each of the degrees of freedom of the agent 102. For example, if the degrees of freedom of the agent 102 comprise the angular positions of one or more joints, the control data 105 may comprise data specifying a desired angular velocity for each degree of freedom of the joint(s).

Optionally, the output layer 111 may generate the control data as a sample from a distribution defined by the inputs to the output layer 111. Thus, the control system 106 as a whole defines a stochastic policy $\pi_\theta$ which outputs a sample from a probability distribution, over the action space $\mathcal{A}$, i.e., specifying a respective probability value for any possible action a in the action space. The probability distribution depends upon the input data to the control system 106. The neural network which implements the control system 106 may be referred to as a "policy network".

Figure 2:
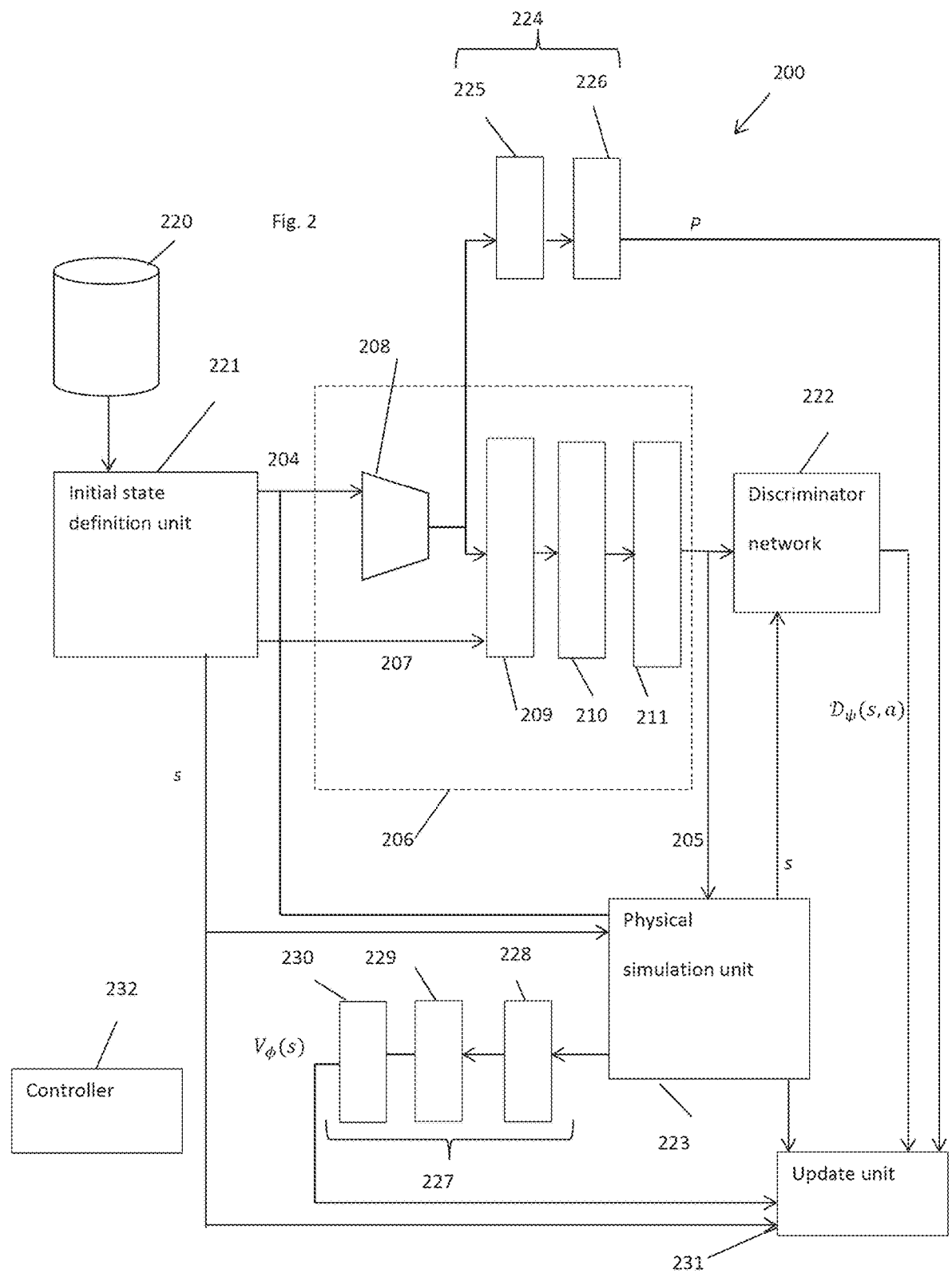
FIG. 2 shows the system used to train the network of FIG. 1.

FIG. 2 illustrates a system 200 within which the control system 106 is trained. In FIG. 2 elements having the same significance as elements of FIG. 1 are given reference numerals 100 higher. Thus, the control system 106 is designated 206. The convolutional network 108 is designated 208, the perceptron 109 is designated 209, and the layers 110 and 111 are denoted 210, 211. The method of operation of the system 200 will be described in more detail below with reference to FIG. 3.

The system 200 includes a database 220 which stores "expert trajectories". These are explained in detail below, but generally speaking are records of instances of an agent performing a computational task under the control of a human expert.

The system 200 further includes an initial state definition unit 221 which defines initial states of the environment and the agent. As described below, the initial state definition unit 221 may do this by selecting a state from the database 220, or by generating a new state at random. The initial state is defined by "physical state data", denoted $s_t$, which specifies the positions and optionally velocities of all objects in the environment when they are in the initial state (the integer index t may for example signify the amount of time for which the training algorithm for the control system 206 has been running when the initial state is defined), and typically also the positions/velocities of all members (components) of the agent. Based on the physical state data for an initial state generated by the initial state definition unit 221, the initial state definition unit 221 generates corresponding "control system state data" comprising image data 204 and proprioceptive data 207, and transmits them respectively to the convolutional network 208 and the perceptron 209. The proprioceptive data 207 of the control system state data may be data comprised in the physical state data. The image data 204 may be generated computationally from the physical state data, as it were captured by imaging the initial state of the environment using a "virtual camera". The position and/or orientation of the virtual camera may be selected at random, e.g., for each respective initial state.

The output of the convolutional network 208 is transmitted both to the perceptron 209, and also to an optional auxiliary task neural network 224. The auxiliary task neural network 224 comprises an input neural network 225 (such as a multilayer perceptron) and an output layer 226. The output of the input neural network 225 is transmitted to the output layer 226 which formats it to generate an output P. As described below, the auxiliary task neural network 222 can be trained to perform an auxiliary task, for example such that the output layer 226 outputs data P characterizing the positions of objects in the environment.

The output of the control system 206 is control data 205 suitable for controlling an agent. No agent is included in the system 200. Instead, the control data transmitted to a physical simulation unit 223 which has additionally received the physical state data $s_t$ corresponding to the initial system state from the initial state definition unit 221. Based on the physical state data $s_t$ and the control data 205, the physical simulation unit 223 is configured to generate simulated physical state data $s_{t+1}$ which indicates the configuration of the environment and of the agent at an immediately following time-step which would result, starting from the initial system state, if the agent 102 performed the action defined by the control data 205.

The control data 205, and the initial physical state data $s_t$ generated by the initial state definition unit 221, are transmitted to a discriminator network 222, which may be implemented as a multi-layer perceptron. (In later steps, described below, counted by the integer index i=1, . . . K, where K is an integer preferably greater than one, the initial physical state data $s_t$ is replaced by physical state data denoted $s_{t+i}$ generated by the physical simulation unit 223.) The discriminator network 222 is explained in more detail below, but in general terms it generates an output value $\mathcal{D}_\psi(s, a)$ which is indicative of how similar the action a specified by the control data 205 is to the action which a human expert would have instructed the agent to make if the environment and the agent were in the initial state.

The physical simulation unit 223 may be configured to use $s_t$ and a to generate updated physical state data $s_{t+1}$, directly indicating the positions/configurations of the objects and the agent in the environment following the performance of action a by the agent. From the updated physical state data $s_{t+1}$, the physical simulation unit 223 generates updated control system state data, i.e., new image data and new proprioceptive data, and feeds these back respectively to the convolutional network 208 and the perceptron 209, so that the control system 206 can generate new control data 205. This loop continues until updated physical state data has been generated K times. The final batch of physical state data is physical state data $s_{t+K}$ for the final state of the environment and agent.

Thus, the system 200 is able to generate a sequence of actions (defined by respective sets of control data) for the agent to take, starting from the initial state defined by the initial state definition unit 221.

As described below with reference to FIG. 3, during the training of the control system 206, the physical state data $s_t$ for the initial state, and subsequently updated physical state data $s_{t+K}$ for the final state of the system after K steps, are transmitted to a value neural network 227 for calculating values $V_\phi(s_t)$ and $V_\phi(s_{t+K})$. The value neural network 227 may comprise a multilayer perceptron 228 arranged to receive the physical state data, and a recurrent neural network 229 such as a LSTM unit arranged to receive the output of the perceptron 228. It further includes an output layer 230 to calculate the value function $V_\phi(s)$ based on the inputs to the output layer 230.

The physical state data output by the initial state definition unit 221 and the physical simulation unit 223, the values $V_\phi(s_t)$ and $V_\phi(s_{t+K})$ generated by the value network 227, the outputs P of the auxiliary task network 224, and the outputs $\mathcal{D}_\psi(s, a)$ of the discriminator network 222 are all fed to an update unit 231. The update unit 231 is configured, based on its inputs, to update the control system 206, e.g., the convolutional network 208, and the layers 209, 210. The update unit 231 is also configured to update the auxiliary task network 224 (e.g., the unit 225), the value network 227, and the discriminator network 222.

The system 200 also comprises a controller 232 which is in charge of initiating and terminating the training procedure.

We now turn to a description of a method 300, illustrated in FIG. 3, for training the control system 206 to perform a task within the system 200, and for subsequently using the system 100 of FIG. 1 to perform that task in the real-world environment. The training employs both datasets describing the performance of the task by an expert, and additional datasets characterizing additional simulated performances of the task by the agent 102 under the control of the control system 206 as it learns. The training combines advantages of imitation learning and reinforcement learning.

In a first step 301 of method 300, a plurality of datasets are obtained characterizing respective instances of performance of the task by a human agent ("expert trajectories"). These datasets are typically generated by instances in which a human controls the agent 102 to perform the task (rather than a human carrying out the task manually without using the agent 102). Each dataset describing an expert trajectories contains physical state data describing the positions and optionally velocities of the object at each of a plurality of time steps when the task was performed by the expert. It further contains data defining the positions and optionally velocities of all members of the agent at these time steps (this may be in the form of proprioceptive data). The datasets may optionally also contain corresponding image data for each of the time steps. However, more preferably such image data is generated from the physical state data by the initial state definition unit 221 later in the method (in step 302, as explained below). The datasets are stored in the database 220.

Optionally, the task may be divided into a number of task-stages. For example, if the task is one of controlling the agent 102 to pick up blocks and stack them, we define three task-stages: reaching of a block, lifting a block, and stacking blocks (i.e., placing a lifted block onto another block). Each of the expert trajectories may partitioned into respective portions corresponding to the task-stages. This is advantageous since reinforcement learning tends to be less successful for tasks having a long duration.

Steps 302-311 describe an iterative process 312 for training the control system 206 within the system 200. The goal is to learn a visuomotor policy which takes as input both the image data 100 (e.g., an RGB camera observation) and the proprioceptive data 107 (e.g. a feature vector that describes the joint positions and angular velocities). The whole network is trained end-to-end.

In step 302, a starting state ("initial state") of the environment and the agent 102 is defined by the initial state definition unit 221. Shaping the distribution of initial states towards states where the optimal policy tends to visit can greatly improve policy learning. For that reason, step 302 is preferably performed using, for each of the task-stages, a respective predefined set of demonstration states ("cluster" of states) which are physical state data for the environment and agent for states taken from the expert trajectories, such that the set of demonstration states for each task-stage is composed of states which are in the portion of the corresponding expert trajectory which is associated with that task-stage. In step 302, with probability f, the initial state is defined randomly. That, is a possible state of the environment and the agent is generated virtually, e.g., by a selection from a predefined probability distribution defined based on the task. Conversely, with probability 1−f a cluster is randomly selected, and the initial state is defined as a randomly chosen demonstration state from that cluster. This is possible since the simulated system is fully characterized by the physical state data.

The initial state $s_t$ defines the initial positions, orientations, configurations and optionally velocities in the simulation of the object(s) and the agent 102.

From the initial physical state data, the initial state definition unit 221 generates simulated control system state data, i.e. image data 204 which is image data which encodes an image which would be captured if the environment (and optionally the agent) in the initial state were imaged by a virtual camera in an assumed (e.g. randomly chosen) position and orientation. Alternatively, the initial state definition unit 221 may read this image data from the database 220 if it is present there. The initial state definition unit 221 transmits the image data 204 to the convolutional network 208.

The initial state definition unit 221 further generates or reads from database 220 proprioceptive data 207 for the initial state, and transmits this to the perceptron 209 as part of the control system state data. Note that the image data 204 and proprioceptive data 207 may not be sufficient, even in combination, to uniquely determine the initial state.

The initial state definition unit 221 passes the physical state data $s_t$ fully describing the initial state to the physical simulation unit 223 and to the update unit 231. The physical simulation unit 223 forwards the physical state data $s_t$ to the discriminator network 222 and the value network 227. (In a variation of the embodiment, the initial state definition unit 221 transmits the initial the physical state data $s_t$ directly to the discriminator network 222 and/or the value network 227.) The value network 227 uses $s_t$ to generate $V_\phi(s_t$, and transmits it to the update unit 231.

In step 303, the control system 206 generates control data 205 specifying an action denoted "$a_t$", and transmits it to the physical simulation unit 223 and to the discriminator network 222.

In step 304, the discriminator network 222 generates a discrimination value $\mathcal{D}_\psi(se, at)$ which is transmitted to the update unit 231.

In step 305, the physical simulation unit 221 simulates the effect of the agent 102 carrying out the action at specified by the control data 205, and thereby generates updated physical state data $s_{t+1}$. Based on the updated physical state data $s_{t+1}$, the physical simulation unit 222 generates updated control system state data (updated image data 204 and updated proprioceptive data 207; the updated proprioceptive data may in some implementations be a portion of the updated physical state data), and transmits them respectively to the convolutional network 208 and to the perceptron 209.

The physical simulation unit 221 also transmits the updated physical state data $s_{t+1}$ to the update unit 231, and to the discriminator network 222.

In step 306, the auxiliary task network 224 generates data P which is transmitted to the update unit 231.

In step 307 the update unit 391 uses $s_{t+1}$ and a task reward function to calculate a reward value. Note that the order of steps 306 and 307 can be different.

In step 308, it is determined whether steps 303-307 have been performed at least K times since the last time at which step 302 was performed. Here K is a positive integer which is preferably greater than one. Note that the case of K=1 is equivalent to omitting step 308.

If the determination in step 308 is negative, the method returns to step 303 and the loop of steps is performed again, using $s_{t+1}$ in place of $s_t$, and generating $s_{t+2}$, instead of $s_{t+1}$. More generally, in the (i+1)-th time that the set of steps 304-308 is performed, $s_{t+i}$ is used in place of $s_t$, and $s_{t+i+1}$ is generated instead of $s_{t+1}$.

If the determination in step 308 is positive, then in step 309 the value network 227 generates $V_\phi(s_{t+K})$. This value is transmitted to the update unit 231. Note that in a variation, the value network 228 may generate the value $V_\phi(s_t)$ at this time too, instead of in step 302.

In step 310, the update unit 231 adjusts the parameters of the control system 206 (that is, parameters of the convolutional network 208, and the neural networks 209, 210), based on the discrimination values $\mathcal{D}_\psi(s, a)$, the reward values obtained in step 307, and the values $V_\phi(s_t)$ and $V_\phi(s_{t+K})$. This step is explained in more detail below. The update unit 231 also adjusts the parameters of the convolutional network 208 and the network 225 of the auxiliary task network 224 based on a comparison of the K outputs P with the K states s. It also adjusts the parameters of the networks 228, 229 of the value network 227. It also adjusts the parameters of the discriminator network 222.

In step 311, the controller 232 determines whether a termination criterion is met (e.g., that a certain amount of time has passed). If not, the method returns to step 302, for the selection of a new initial state.

If the determination in step 311 is positive, then in step 313 the trained control system 206 is used as the control system 106 of the system 100, i.e., to control a real agent 102 in the real world based on real-world images and proprioceptive data.

To explain the update carried out in step 310 we start with a brief review of the basics of two known techniques: generative adversarial imitation learning (GAIL) and proximal policy optimization (PPO).

As noted above, imitation learning (IL) is the problem of learning a behavior policy by mimicking human trajectories (expert trajectories). The human demonstrations may be provided as a dataset of N state-action pairs $\mathcal{D} = \{(s_i, a_i)\}_{i=1,\ldots,N}$. Some imitation learning methods cast the problem as one of supervised learning, i.e., behavior cloning. These methods use maximum likelihood to train a parameterized policy $\pi_\theta: \mathcal{S} \to \mathcal{A}$, where $\mathcal{S}$ is the state space (i.e., each possible state s is a point in $\mathcal{S}$) and $\mathcal{A}$ is the action space (i.e. each possible action a is a point in $\mathcal{A}$), such that $\theta^* = \arg\max_\theta \Sigma_N \log \pi_\theta(a_i/s_i)$. The policy $\pi_\theta$ is typically a stochastic policy which, for a given input s, outputs a probability distribution over the action space $\mathcal{A}$, i.e., specifying a respective probability value for any possible action a in the space; thus, the agent 102 is provided with control data a which is a sample from this probability distribution.

The GAIL ("Generative adversarial imitation learning" Jonathan Ho and Stefano Ermon. In NIPS, pages 4565-4573, 2016.) technique allows an agent to interact with an environment during its training and learn from its experiences. Similar to Generative Adversarial Networks (GANs), GAIL employs two networks, a policy network $\pi_\theta: \mathcal{S} \to \mathcal{A}$ and a discriminator network $\mathcal{D}_\psi: \mathcal{S} \times \mathcal{A} \to [0,1]$.

GAIL uses a min-max objective function similar to that of GANs to train $\pi_\theta$ and $\mathcal{D}_\psi$ together:

$$\min_\theta \max_\psi \left( \mathbb{E}_{\pi_E}[\log \mathcal{D}_\psi(s,a)] + \mathbb{E}_{\pi_\theta}[\log(1 - \mathcal{D}_\psi(s,a))] \right) \quad (1)$$

where $\pi_E$ denotes the expert policy that generated the expert trajectories. This objective encourages the policy $\pi_\theta$ to have an occupancy measure close to that of the expert policy $\pi_E$. The discriminator network $\mathcal{D}_\psi$ is trained to produce a high value for states s and actions a, such that the action a has a high (low) probability under the expert policy $\pi_E(s)$ and a low (high) probability under the policy $\pi_\theta(s)$.

IL approaches works effectively if demonstrations are abundant, but robot demonstrations can be costly and time-consuming to collect, so the method 200 uses a process which does not require so many of them.

In continuous domains, trust region methods greatly stabilize policy training. Recently, proximal policy optimization PPO has been proposed (John Schulman, et al, "Proximal policy optimization algorithms", arXiv preprint, arXiv: 1707.06347, 2017) as a simple and scalable technique for policy optimization. PPO only relies on first-order gradients and can be easily implemented with recurrent networks in a distributed setting. PPO implements an approximate trust region that limits the change in the policy per iteration. This is achieved via a regularization term based on the Kullback-Leibler (KL) divergence, the strength of which is adjusted dynamically depending on actual change in the policy in past iterations.

Returning to the discussion of the method 300, the step 310 adjusts $\pi_\theta$ with policy gradient methods to maximize a hybrid reward $r(s_t, a_t)$ given by a hybrid reward function:

$$r(s_t, a_t) = \lambda r_{gail}(s_t, a_t) + (1-\lambda) r_{task}(s_t, a_t) \lambda \in [0,1] \quad (2)$$

This reward function is a hybrid in the sense that the first term on the right represents imitation learning, using the discriminator 222, and the second term on the right represents reinforcement learning.

Here, $r_{gail}$ is a first reward value (an "imitation reward value") which is a discounted sum of a reward function, defined by an imitation reward function $r_{gail}(s_t, a_t) = -\log(1 - \mathcal{D}_\psi(s,a))$, clipped at a max value of 10.

$r_{task}(s_t, a_t)$ is a second reward value (a "task reward value") defined by the task reward function, which may be designed by hand for the task. For example, when doing block lifting, $r_{task}(s_t, a_t)$ may be 0.125 if the hand is close to the block and 1 if the block is lifted. The task reward permits reinforcement learning.

Optionally, the task reward function may be designed to be different respective functions for each task-stage. For example, the task reward function may be respective piece-wise-constant functions for each of the different task-stages of the task. Thus, the task reward value only changes when the task transits from one stage to another. We have found defining such a sparse multi-stage reward easier than handcrafting a dense shaping reward and less prone to producing suboptimal behaviors.

Maximizing the hybrid reward can be interpreted as simultaneous reinforcement and imitation learning, where the imitation reward encourages the policy to generate trajectories closer to the expert trajectories, and the task reward encourages the policy to achieve high returns on the task. Setting $\lambda$, to either 0 or 1 reduces this method to the standard RL or GAIL setups. Experimentally, we found that choosing $\lambda$, to be between 0 and 1, to give a balanced contribution of the two rewards, produced a trained control system 206 which could control agents to solve tasks that neither GAIL nor RL can solve alone. Further, the controlled agents achieved higher returns than the human demonstrations owing to the exposure to task rewards.

Note that although in the training system 200 of FIG. 2, the control system 206 being trained receives only the image data 204 and the proprioceptive data 207 (like the control system 106 in the system 100 of FIG. 1), the discriminator network 222 and the value network 227 receive input data specifying the positions and/or orientations and/or velocities of objects of the simulated environment and optionally also of members of the simulated agent. This input data is (or is generated from) the physical state data generated by the initial state definition unit 221 and the physical simulation unit 223. Even though such privileged information is unavailable in the system 100, the system 200 can take advantage of it when training the control system 206 in simulation.

The optional value network 227 is used by the update unit 231 to obtain values $V_\phi(s_t)$ and $V_\phi(s_{t+K})$ which are used together with reward value calculated in step 307 to obtain an advantage function estimator. The advantage function estimator is a parameter used to obtain a gradient estimator for $r(s_t, a_t)$. The gradient estimator may, for example, take the form:

$$\text{gradient} = \mathbb{E}_t[\nabla_\theta \log \pi_{74}(a_t|s_t)\hat{A}_t]$$

In step 310, the update unit 231 uses the discounted sum of rewards and the value as an advantage function estimator:

$$\hat{A}_t = \Sigma_{i=1}^{K} \gamma^{i-1} r_{t+i} + \gamma^{K-1} V_\phi(s_{t+K}) - V_\phi(s_t), \qquad (3)$$

where $\gamma$ is a discount factor and $r_{t+i} \equiv r(s_{t+i-1}, a_{t+i-1})$.

The value network 227 is trained in the same way as in the PPO paper mentioned above. Since the policy gradient uses output of the value network to reduce variance, it is beneficial to accelerate the training of the value network 227. Rather than using pixels as inputs to the value network 227 (as for the control system (policy network) 206), as noted above the value network 227 preferably receives the physical state data output by the initial state definition unit 221 and the physical simulation unit 223 (e.g., specifying the position and velocity of the simulated 3D object(s) and the members of the agent 102). Experimentally it has been found that training the control system 206 and value network 227 based on different input data stabilizes training and reduces oscillation of the agent's performance. Furthermore, the multilayer perceptron 228 of the value network 227 is preferably smaller (e.g., includes fewer neurons and/or layers) than perceptron 209 of the control system 206, so it converges to a trained state after fewer iterations.

As noted above, like the value network 227, the discriminator network 222 preferably receives input data specifying the positions and/or orientations and/or velocities of objects of the simulated environment and optionally also of members of the simulated agent. Furthermore, optionally, this data may be encoded in a task-specific way, i.e., as task specific features chosen based on the task. The input data to the discriminator network 222 is formatted to indicate (directly, not implicitly) absolute or relative positions of objects in the simulated environment which are associated with the task. We refer to this as an "object centric" representation, and it leads to improved training of the control system 206. Thus, this object-centric input data provides salient and relevant signals to the discriminator network 222. By contrast, the input data to the discriminator network 222 preferably does not include data indicating the positions/velocities of members of the simulated agent. Experimentally, it has been found that including such information in the input to the discriminator network 222 leads the discriminator network 222 to focus on irrelevant aspects of the behavior of the agent and is detrimental for training of the control system 206. Thus, preferably the input data to the discriminator network 222 only includes the object-centric features as input while masking out agent-related information.

The construction of the object-centric representation is based on a certain amount of domain knowledge of the task. For example, in the case of a task in which the agent comprises a gripper, the relative positions of objects and displacements from the gripper to the objects usually provide the most informative characterization of a task. Empirically, it was found that the systems 100, 200 are not very sensitive to the particular choices of object-centric features, as long as they carry sufficient task-specific information.

The function of the optional auxiliary task neural network 224 is to train the convolutional neural network 208, while simultaneously training the multilayer perceptron 225. This training is effective in increasing the speed at which the convolutional neural network 208 is trained, while also improving the final performance. Note that the convolution neural network 208 is preferably not trained exclusively via the auxiliary tasks, but also in the updates to the control system 206 in order to learn the policy.

The auxiliary task neural network 224 may, for example, be trained to predict the locations of objects in the simulated environment from the camera observation. The output layer 226 may be implemented as a fully-connected layer to output the 3D coordinates of objects in the task, and the training of the neural network 225 (and optionally output layer 226) together with the training of the convolutional network 208 is performed to minimize the l2 loss between the predicted and ground-truth object locations.

In step 310 all the neural networks 208, 225, 209, 210, 228, 229 of system 200 are preferably updated, so that in the method 300 as a whole they are all trained simultaneously.

The updates to the discriminator network 222 may be performed in the same way as in the GAIL paper mentioned above.

Figure 3:
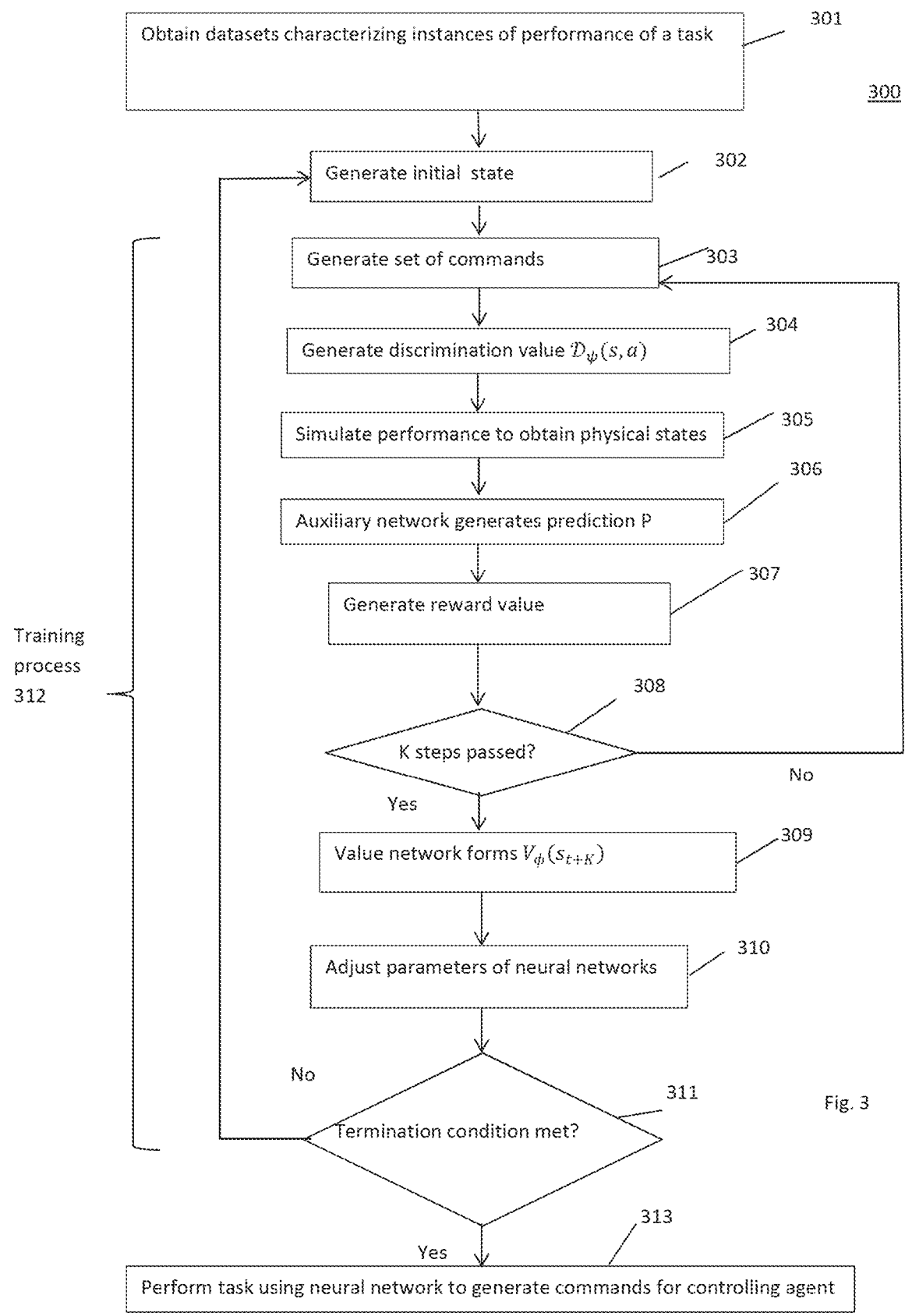
FIG. 3 shows steps of a method according to the disclosure carried out by the system of FIG. 2.

Although the explanation of FIG. 3 above is terms of a method performed by the system 200 of FIG. 2, more preferably the method is performed in parallel by a plurality of workers under the control of the controller 232. For each worker the training is performed according to steps 302-310, using Eqn. (2) on a respective instance of the control system 206. The convolutional network 208 may be shared between all workers.

A single discriminator network 222 may be provided shared between all the workers. The discriminator network 222 may be produced by maximization of an expression which is a variant of Eqn. (1) in which there is no minimization over 0, and in which the final term is an average over all the workers, rather than being based on a single policy network.

Exemplary resultant networks are found to improve on imitation learning and reinforcement learning in a variety of tasks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for controlling a robotic agent to perform a task, the method comprising:
    obtaining, for each of a plurality of performances of the task by a real-world agent controlled by an operator in a real-world environment, a respective demonstration dataset characterizing the corresponding performance of the task in the real-world environment; and
    training a neural network for controlling a simulated robotic agent to perform the task in a simulated environment using the demonstration dataset, the training comprising:
        obtaining (i) simulated image data encoding simulated camera images characterizing a current state of the simulated environment and (ii) simulated proprioceptive data comprising one or more variables characterizing configurations of the simulated robotic agent;
        processing at least (i) the simulated image data and (ii) the simulated proprioceptive data using the neural network, according to current values of parameters of the neural network, to generate one or more sets of control commands for controlling movements of a plurality of components of the simulated robotic agent;
        for each set of control commands, computing a task reward value characterizing how successfully the task is carried out upon implementation of the set of control commands by the simulated robotic agent in the simulated environment; and
        adjusting the parameters of the neural network based on a hybrid energy function including (i) an imitation reward value derived using the demonstration datasets obtained for the real-world environment and the sets of control commands generated for the simulated environment and (ii) a task reward term computed using the task reward values; and
    using the trained neural network to control the real-world robotic agent to perform the task in the real-world environment.

2. The method of the claim 1, wherein the training further comprises:
    using the demonstration datasets to generate a discriminator network; and
    determining the imitation reward value using the discriminator network and the sets of one or more control commands.

3. The method of claim 2, wherein the discriminator network is configured to receive data characterizing positions of one or more objects in the simulated environment.

4. The method of claim 1, wherein generating the task reward value comprises:
simulating a process carried out by the simulated robotic agent in the simulated environment based on the corresponding set of control commands to generate a final state of the simulated environment; and
computing an initial task reward value based at least on the final state of the simulated environment.

5. The method of claim 4, wherein updates to the neural network are calculated using an activation function estimator obtained by subtracting a value function from the initial task reward value, and the initial reward value is calculated according to a task reward function based on the final state of the environment.

6. The method of claim 5, wherein the value function is computed using data characterizing positions of one of more objects in the simulated environment.

7. The method of claim 5, wherein the value function is computed by an adaptive model.

8. The method of claim 1, wherein the neural network comprises:
a convolutional neural network configured to process the simulated image data to generate convolved data; and
at least one adaptive component configured to process the output of the convolutional neural network and the simulated proprioceptive data.

9. The method according to claim 8, wherein the adaptive component is a perceptron.

10. The method of claim 8, wherein the neural network further comprises a recursive neural network configured to receive input data generated both from the simulated image data and the simulated proprioceptive data.

11. The method of claim 8, further comprising:
defining at least one auxiliary task, and training the convolutional network as part of an adaptive system which is trained to perform the auxiliary task based on the simulated image data.

12. The method of claim 1, wherein:
the training of the neural network is performed in parallel with the training of a plurality of additional instances of the neural network by respective workers.

13. The method of claim 1, wherein using the neural network to generate the control commands comprises:
defining a plurality of task stages of the task, wherein each respective task stage defines a corresponding portion in a plurality of portions of the task;
for each respective task stage, generating a respective set of demonstration states, wherein the respective set of demonstration states are selected from states defined in one or more of the demonstration datasets and characterize performance of the portion of task corresponding to the respective task stage;
randomly selecting, with a predefined probability, a task stage from the plurality of task stages;
randomly selecting an initial state from the respective set of demonstration states generated for the selected task stage; and
providing, as input to the neural network, data characterizing the simulated environment and the simulated agent at the respective initial stage.

14. A system comprising one or more computers and one or more storage devices storing instructions that when executed by the one or more computers cause the one or more computers to perform operations for controlling a robotic agent to perform a task, the operations comprising:
obtaining, for each of a plurality of performances of the task by a real-world agent controlled by an operator in a real-world environment, a respective demonstration dataset characterizing the corresponding performance of the task in the real-world environment; and
training a neural network for controlling a simulated robotic agent to perform the task in a simulated environment using the demonstration dataset, the training comprising:
obtaining (i) simulated image data encoding simulated camera images characterizing a current state of the simulated environment and (ii) simulated proprioceptive data comprising one or more variables characterizing configurations of the simulated robotic agent;
processing at least (i) the simulated image data and (ii) the simulated proprioceptive data using the neural network, according to current values of parameters of the neural network, to generate one or more sets of control commands for controlling movements of a plurality of components of the simulated robotic agent;
for each set of control commands, computing a task reward value characterizing how successfully the task is carried out upon implementation of the set of control commands by the simulated robotic agent in the simulated environment; and
adjusting the parameters of the neural network based on a hybrid energy function including (i) an imitation reward value derived using the demonstration datasets obtained for the real-world environment and the sets of control commands generated for the simulated environment and (ii) a task reward term computed using the task reward values; and
using the trained neural network to control the real-world robotic agent to perform the task in the real-world environment.

15. The system of claim 14, wherein the training further comprises:
using the demonstration datasets to generate a discriminator network; and
determining the imitation reward value using the discriminator network and the sets of one or more control commands.

16. The system of claim 15, wherein the discriminator network is configured to receive data characterizing positions of one or more objects in the simulated environment.

17. The system of claim 14, wherein generating the task reward value comprises:
simulating a process carried out by the simulated robotic agent in the simulated environment based on the corresponding set of control commands to generate a final state of the simulated environment; and
computing an initial task reward value based at least on the final state of the simulated environment.

18. The system of claim 17, wherein updates to the neural network are calculated using an activation function estimator obtained by subtracting a value function from the initial task reward value, and the initial reward value is calculated according to a task reward function based on the final state of the environment.

19. The system of claim 18, wherein the value function is computed using data characterizing positions of one of more objects in the simulated environment.

20. One or more non transitory computer storage media storing computer program instructions that, when executed by one or more computers, cause the one or more computers to perform operations for controlling a robotic agent to perform a task, the operations comprising:

obtaining, for each of a plurality of performances of the task by a real-world agent controlled by an operator in a real-world environment, a respective demonstration dataset characterizing the corresponding performance of the task in the real-world environment; and training a neural network for controlling a simulated robotic agent to perform the task in a simulated environment using the demonstration dataset, the training comprising:

obtaining (i) simulated image data encoding simulated camera images characterizing a current state of the simulated environment and (ii) simulated proprioceptive data comprising one or more variables characterizing configurations of the simulated robotic agent;

processing at least (i) the simulated image data and (ii) the simulated proprioceptive data using the neural network, according to current values of parameters of the neural network, to generate one or more sets of control commands for controlling movements of a plurality of components of the simulated robotic agent;

for each set of control commands, computing a task reward value characterizing how successfully the task is carried out upon implementation of the set of control commands by the simulated robotic agent in the simulated environment; and adjusting the parameters of the neural network based on a hybrid energy function including (i) an imitation reward value derived using the demonstration datasets obtained for the real-world environment and the sets of control commands generated for the simulated environment and (ii) a task reward term computed using the task reward values; and using the trained neural network to control the real-world robotic agent to perform the task in the real-world environment.

* * * * *